US008203572B2

(12) United States Patent
Park et al.

(10) Patent No.: US 8,203,572 B2
(45) Date of Patent: Jun. 19, 2012

(54) ORGANIC LIGHT EMITTING DISPLAY DEVICE AND PROCESSING METHOD OF IMAGE SIGNALS THEREOF

(75) Inventors: Kyong-Tae Park, Suwon-si (KR); Baek-Woon Lee, Yongin-si (KR); Alexander Arkhipov, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 931 days.

(21) Appl. No.: 12/243,230

(22) Filed: Oct. 1, 2008

(65) Prior Publication Data

US 2009/0213048 A1 Aug. 27, 2009

(30) Foreign Application Priority Data

Feb. 26, 2008 (KR) ........................ 10-2008-0017254

(51) Int. Cl.
*G09G 5/02* (2006.01)
*G06K 9/00* (2006.01)

(52) U.S. Cl. ......... 345/600; 345/589; 345/603; 382/167

(58) Field of Classification Search .................. 345/589, 345/600, 603; 382/167
See application file for complete search history.

(56) References Cited

U.S. PATENT DOCUMENTS

| | | | | |
|---|---|---|---|---|
| 6,757,330 | B1 * | 6/2004 | Hsu | 375/240.17 |
| 2003/0034992 | A1 * | 2/2003 | Brown Elliott et al. | 345/690 |
| 2004/0004444 | A1 * | 1/2004 | Choi et al. | 315/169.2 |
| 2004/0178974 | A1 * | 9/2004 | Miller et al. | 345/82 |
| 2004/0263528 | A1 * | 12/2004 | Murdoch et al. | 345/600 |
| 2005/0212728 | A1 * | 9/2005 | Miller et al. | 345/76 |
| 2005/0258429 | A1 * | 11/2005 | Cok et al. | 257/79 |
| 2005/0264149 | A1 * | 12/2005 | Cok et al. | 313/110 |
| 2006/0098738 | A1 * | 5/2006 | Cosman et al. | 375/240.16 |
| 2006/0262147 | A1 * | 11/2006 | Kimpe et al. | 345/690 |
| 2007/0176859 | A1 * | 8/2007 | Cok et al. | 345/76 |
| 2008/0068310 | A1 * | 3/2008 | Choi et al. | 345/82 |
| 2008/0088548 | A1 * | 4/2008 | Lee et al. | 345/77 |
| 2008/0150850 | A1 * | 6/2008 | Park et al. | 345/83 |

* cited by examiner

*Primary Examiner* — David T Welch
(74) *Attorney, Agent, or Firm* — Innovation Counsel LLP

(57) ABSTRACT

The present invention relates to an organic light emitting display device and a method for processing image signals thereof. An organic light emitting display device according to the present invention receives a plurality of input image signals respectively corresponding to the pixels representing a first color, a second color, a third color, and a white color, and converts the input image signals of at least two dots respectively representing the first color to the third color among the input image signals according to a first extension coefficient to generate a plurality of four-color image signals of at least two dots respectively representing the first color, the second color, the third color, and the white color, to respectively sum a distortion amount of a color impression of the four-color image signals of at least two dots, to calculate a partial extension coefficient corresponding to the sum result, and to extension-convert the input image signals of at least two dot according to the partial extension coefficient thereby generating the four-color output image signals of at least two dots.

22 Claims, 7 Drawing Sheets

ORGANIC LIGHT EMITTING DISPLAY DEVICE AND PROCESSING METHOD OF IMAGE SIGNALS THEREOF

CROSS-REFERENCE TO RELATED APPLICATION

This application claims priority to and the benefit of Korean Patent Application No. 10-2008-0017254 filed in the Korean Intellectual Property Office on Feb. 26, 2008, whose entire disclosure is incorporated herein by reference.

BACKGROUND (a) Field of Invention

The present disclosure of invention relates to organic light emitting display devices (OLEDD's) and a driving method thereof, and particularly to an organic light emitting display device including a white light emitting pixel in addition to primary color pixels in each picture dot and a driving method for such a four color system.

(b) Description of Related Technology

In recent years, as a substitute for cathode ray tubes (CRTs), flat panel displays have been actively developed. The typical flat panel display includes a plurality of pixels arranged in a rectangular matrix shape and emitting just three primary colors (e.g., R, G, B). A desired one color may be provided by combining primary color outputs emitted from adjacent pixels, and the flat panel display can then display desired images by appropriately controlling the luminance of each primary color pixel.

While most flat panels generally display color images by combining three primary colors such as of red, green, and blue, particularly in the case of organic light emitting devices (OLED's), color images are displayed according to corresponding input image signals by sometimes adding a white light emitting pixel (or a non-color-filtered transparent pixel) in addition to the three primary color emitting pixels to thereby increase luminance. This configuration is called a four-color flat organic light emitting device (4c-OLED). Luminence is increased because there is only so much of an intensity in a 3c-OLED that each of the R, G, B emitters can be safely driven to. So, for example, if each R, G, B emitter has a respective relative drive range between 0 and 255, the maximum luminance that can be output as light corresponds to a drive intensity of FF,FF,FF in terms of hexadecimal expression. However, if a fourth, white light emitting emitter is added, then the maximum luminance that can be output as light extends beyond that associated with the 3c-OLED FF,FF,FF output.

In the four-color flat organic light emitting device (4c-OLED), the three-color image signals that are received as conventional input are often converted into corresponding four-color image signals in order to display images of enhanced or extended luminance on the 4c-OLED. When converting the three-color image signals into four-color image signals, the color impression of three input image signals may be undesirably changed because the added white-light emitter changes the perception of color that would be otherwise seen by the human eye if only the three primary pixels were driven. In terms of greater detail about this, when a first emitter displays a pure color such as yellow (red plus green) and then a supplementing white pixel is added for the purpose of increasing luminance, the eye-perceived color impression of the originally intended, red plus green equals yellow (R+G=Y) is changed. That is, the viewer no longer perceives a pure yellow. Instead the eye may perceive white mixed with yellow, or an off-yellow coloration. Accordingly a distortion phenomenon is added to the intended color impression whereby the color perceived is different than the original yellow color that was intended. To solve this problem, when converting from the three-color image domain into a four-colors emitters domain, the maximum supplement to luminance that is provided by the additional white pixel may have to be limited. However, if the latter is done across a full image of all color permuations, the overall luminance is disadvantageously decreased even when displaying images that do not call for only pure colors such as pure yellow (R+G=Y). This failure to provide maximum luminance is a serious problem because the primary purpose of including a white pixel in the four-color organic light emitting display device is so that luminance can be enhanced.

It is to be understood in reading the above that an organic light emitting diode (OLED) that is the light-emitting element of the organic light emitting display device emits according to a magnitude of current flowing through the organic light emitting diode. Maximum luminance per OLED is often limited because the operational lifetime of the organic light emitting diode tends to decrease according to the magnitude of the current flowing in the organic light emitting diode, and the organic light emitting diode can be damaged (e.g., burned out) if driven with a large current exceeding a predetermined value for too long of a time.

The above information disclosed in this Background section is only for enhancement of understanding of the technologies involved with the present disclosure of invention and therefore it may contain information that does not constitute prior art of a kind that is already publicly known persons of ordinary skill in the art.

SUMMARY

The present disclosure of invention provides an organic light emitting display device and a processing method of image signals to increase the overall luminance of a four-color organic light emitting display device and to prevent a decrease of the lifetime and damage of the organic light emitting diodes in such a device.

An organic light emitting display device according to the present invention includes a display panel including a plurality of pixels displaying a first color, a second color, a third color, and a white color, and a signal processor receiving a plurality of input image signals respectively corresponding to the pixels and converting the input image signals of at least two dots respectively representing the first color to the third color among the input image signals according to a first extension coefficient to generate a plurality of four-color image signals of at least two dots respectively representing the first color, the second color, the third color, and the white color, to respectively sum a distortion amount of a color impression of the four-color image signals of at least two dots, to calculate a partial extension coefficient corresponding to the sum result, and to extension-convert the input image signals of at least two dots according to the partial extension coefficient to thereby generate the four-color output image signals of at least two dots. The signal processor includes: an RGBW converter extension-converting the input image signals of at least two dots according to the first extension coefficient to generate the four-color image signal of at least two dots, calculating an excess value by comparing grays respectively corresponding to the four-color image signal of at least two dots with a maximum gray, and extension-converting the input image signal of at least two dots according to the partial extension coefficient to generate the four-color output image signals of at least two dots; a distortion adder calculating and summing the distortion of the color impression by using the calculated excess value to calculate the distortion amount of the color impression of a first region of the display panel corresponding to the input image signals of at least two dots; and a partial extension coefficient determiner calculating a partial extension coefficient according to the distortion amount of the color impression of the first region, estimating the partial extension coefficient as the partial extension coefficient of the first region, and transmitting the partial extension coefficient to the RGBW converter. The partial extension coefficient determiner amends the partial extension coefficient of the first region by interpolating into the entire region of the display panel, and the partial extension coefficient corresponds to each address of the input image signal of at least two dots. The RGBW converter extension-converts the input image signals of at least two dots by using the partial extension coefficient according to the address to generate the four-color output image signal of at least two dots. The signal processor further includes a rearrangement portion receiving the four-color output image signals, and respectively rearranging the four-color output image signal according to the arrangement structure of the pixels.

The pixels are divided into a plurality of groups and the display panel is divided into a plurality of regions according to the groups, and the signal processor calculates the partial extension coefficient according to the sum result of the distortion of the color impression of the input image signals respectively corresponding to regions. The first extension coefficient is a partial extension coefficient corresponding to the region representing at least two input image signals among the plurality of partial extension coefficients respectively corresponding to the regions in the previous frame.

The signal processor according the present invention: converts the magnitude of the input image signal according to a scale factor; extension-converts the converted input image signal of at least two dots among the converted input image signals according to the first extension coefficient to generate the four-color image signals of at least two dots corresponding to the first color, the second color, the third color, and the white color, to respectively sum the distortion amount of the color impression of the four-color image signal of at least two dots, to calculate the partial extension coefficient according to the sum result, and to extension-convert the converted input image signals of at least two dots according to the partial extension coefficient thereby generating the four-color output image signals of at least two dots corresponding to the first color, the second color, the third color, and the white color; calculates a current amount corresponding to the four-color output image signals; and changes the maximum extension coefficient as a maximum value of the partial extension coefficient and the scale factor when the current is exceeds a predetermined range. The current amount is a total amount of the current corresponding to the four-color output image signal of one frame unit. The signal processor includes: a scaler converting the magnitude of the input image signals according to the scale factor, and generating the converted input image signals converted by the scale factor; an RGBW converter respectively extension-converting the converted input image signals corresponding to the first extension coefficient to generate the four-color image signals, comparing the grays respectively corresponding to the four-color image signals of at least two dots with the maximum gray to calculate each excess value, and extension-converting the converted input image signal according to the partial extension coefficient to generate the four-color output image signal; a distortion adder calculating the distortion amount of the color impression by using the calculated excess value, and summing the distortion amount of the color impression corresponding to the first region of the display panel corresponding to at least two converted input image signals; a partial extension coefficient determiner calculating the partial extension coefficient according to the summed distortion amount of the color impression, estimating the calculated partial extension coefficient to be smaller than the maximum extension coefficient as the partial extension coefficient of the first region, and transmitting the partial extension coefficient to the RGBW converter; and a controller detecting the current amount of the four-color output image signals and controlling at least one among the scale factor and the maximum extension coefficient when the current amount exceeds the predetermined range for the current amount to be included in the predetermined range. The controller determines whether the scale factor is the maximum value if the current amount is less than the predetermined range, and if the scale factor is the maximum value, the maximum extension coefficient is increased by the predetermined range, while if the scale factor is less than the maximum value, the scale factor is increased. The controller determines whether the maximum extension coefficient is the minimum value if the current amount is more than the predetermined range, and if the maximum extension coefficient is the minimum value, the scale factor is decreased by the predetermined range, while if the maximum extension coefficient is more than the maximum value, the maximum extension coefficient is decreased. The partial extension coefficient determiner amends the partial extension coefficient of the first region by interpolating into the entire region of the display panel, and transmits the partial extension coefficient along with the amended partial extension coefficient corresponding to the input image signal of at least two dots and the corresponding address to the RGBW converter. The RGBW converter extension-converts the input image signal by using the partial extension coefficient corresponding to the address to generate the four-color output image signals. The signal processor further includes a rearrangement portion receiving the four-color output image signal, and rearranging and storing the four-color output image signal according to the arrange structure of the pixel.

A method for processing image signals of an organic light emitting display device including a plurality of pixels representing a first color, a second color, a third color, and a white color and generating a plurality of four-color output image signals by extension-converting a plurality of input image signals representing the first to third colors includes: extension-converting a plurality of input image signals of at least two dots among the input image signals for the first to third colors according to the first extension coefficient to generating the four-color image signals of at least two dots; calculating a distortion amount of a color impression corresponding to at least two dots, summing the calculated distortion amounts of the color impressions, and calculating a partial extension coefficient corresponding -to the distortion amount of the color impression; and extension-converting the input image signals according to the partial extension coefficient to generate the four-color output image signals. The calculating of the partial extension coefficient includes calculating an excess value by comparing each gray of the first to third colors among the four-color image signal of at least two dots except for the white color with the maximum gray; calculating the distortion amount of the color impression of each of the dots by summing the calculated excess values with the dot unit; and adding the calculated distortions of the color impressions. The calculating of the partial extension coefficient further includes amending the partial extension coefficient by interpolating into the entire region of the display panel. In the generating of the four-color output image signal, the input image signals are extension-converted by using the partial extension coefficient corresponding to the address to generate the four-color output image signals. The method further includes receiving the four-color output image signals and rearranging the four-color output image signals according to the arrangement structure of the pixels. The first extension coefficient is a partial extension coefficient corresponding to the region representing the input image signal of at least two dots in the previous frame.

A method for processing image signals of an organic light emitting display device including a plurality of pixels representing a first color, a second color, a third color, and a white color and generating a plurality of four-color output image signals by extension-converting a plurality of input image signals representing the first to third colors includes: converting the magnitude of the input image signals according to a scale factor for the first to third colors, and generating the converted input image signals by the scale factor; extension-converting the converted input image signals of at least two dots among the converted input image signals according to a first extension coefficient to generate the four-color image signals of at least two dots; calculating a distortion amount of a color impression corresponding to at least two dots, summing the calculated distortion amounts of the color impressions, and calculating a partial extension coefficient corresponding to the summed distortion amounts of the color impressions and less than a maximum value of the partial extension coefficient; extension-converting the input image signals according to the partial extension coefficient to generate the four-color output image signals; and calculating the current amount corresponding to the four-color output image signal, and changing the scale factor or the maximum extension coefficient when the current exceeds the predetermined range. The changing of the scale factor or the maximum extension coefficient includes: determining whether the scale factor is the maximum value if the current amount is less than the predetermined range; increasing the maximum extension coefficient by the predetermined range if the scale factor is the maximum value; and increasing the scale factor if the scale factor is less than the maximum value. The changing of the scale factor or the maximum extension coefficient includes: determining whether the maximum extension coefficient is the minimum value if the current amount is more than the predetermined range; decreasing the scale factor by the predetermined range if the maximum extension coefficient is the minimum value; and decreasing the maximum extension coefficient if the maximum extension coefficient is more than the minimum value.

In the present invention, the extension coefficient is different according to the partial region such that it is not necessary to decrease the extension coefficient of the entire region to display the pure color, thereby increasing the overall luminance. Also, the current amount input to the organic light emitting diode is decreased due to the increase of the overall luminance such that the lifetime of the organic light emitting diode may be improved and the consumption power may be reduced.

Also, the present invention limits the total of the current amount of one frame so that is not over the predetermined range. Accordingly, increased luminance may be provided by using the partial extension coefficient compared with the use of the equal extension coefficient for the entire display panel. Also, the reduction of the lifetime and the increase of the consumption power of the organic light emitting diode due to the excess of the total current amount over the predetermined range that is generated by the may be prevented.

DETAILED DESCRIPTION

In the following detailed description, certain exemplary embodiments are shown and described merely for purpose of illustration. As those skilled in the art would realize, the described embodiments may be modified in various different ways, all without departing from the spirit or scope of the present disclosure.

Now, a first organic light emitting display device (OLEDD) according to an exemplary embodiment of the present disclosure will be described in detail with reference to FIG. 1 to FIG. 3.

Figure 1:
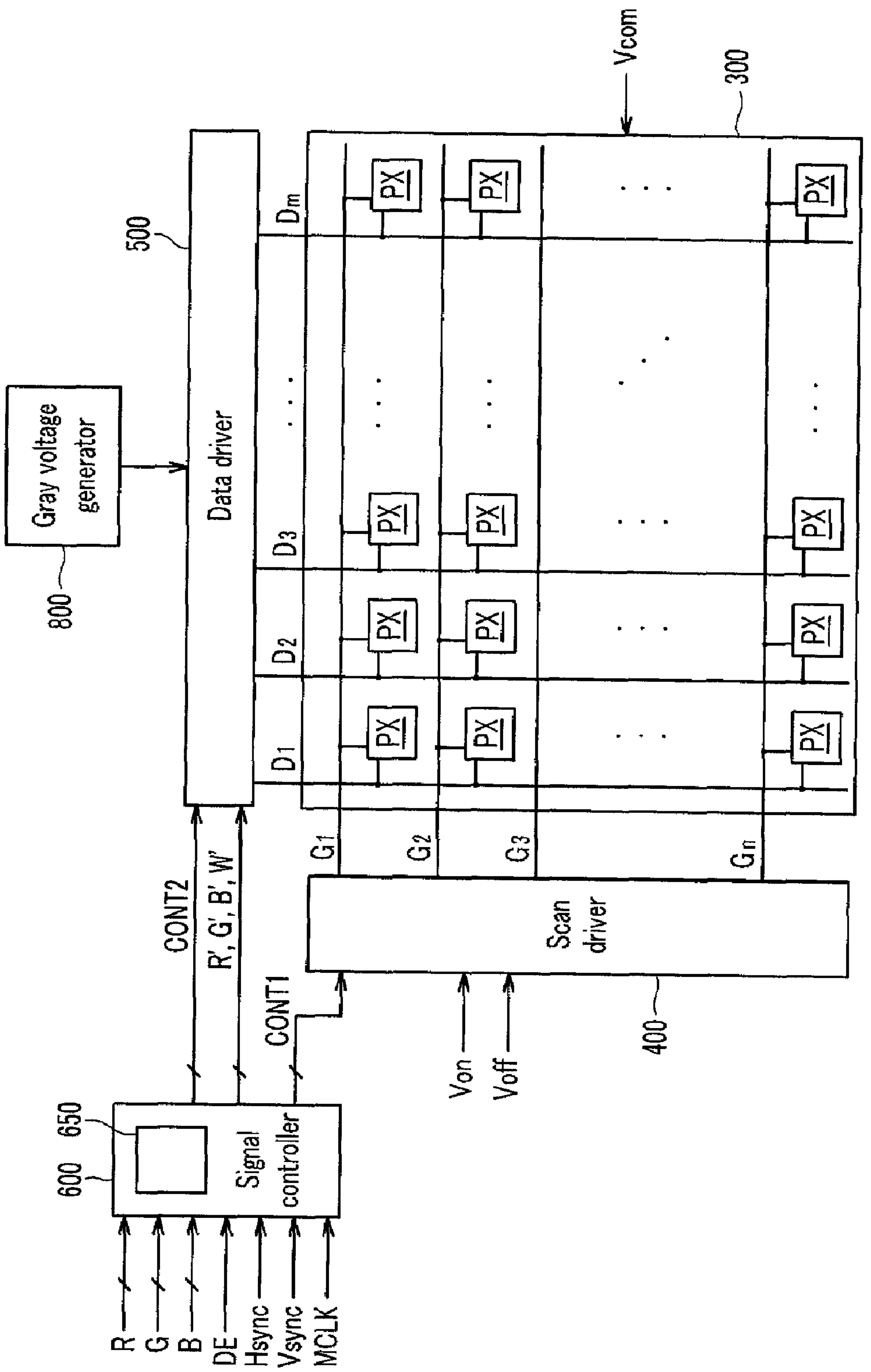
FIG. 1 is a block diagram of an organic light emitting display device according to an exemplary embodiment.

FIG. 1 is a block diagram of an organic light emitting display device according to an exemplary embodiment. FIG. 2 is an equivalent circuit diagram for one pixel of an organic light emitting display device according to an exemplary embodiment. FIG. 3 is a view showing a plurality of pixels of an organic light emitting display device according to an exemplary matrix arrangement.

As shown in FIG. 1, an organic light emitting display device according to an exemplary embodiment includes a display panel 300, a scan driver 400 and a data driver 500 that are connected to the display panel 300, as well as a gray voltage generator 800 connected to the data driver 500, and a signal controller 600 that controls them.

Referring to the equivalent circuit of FIG. 1, the display panel 300 includes a plurality of gate signal lines G1-Gn and data signal lines D1-Dm, as well as a plurality of reference voltage lines (Vdd, Vgnd, not shown), and a plurality of pixels PX connected to the signal lines G1-Gn and D1-Dm and arranged substantially in a matrix shape.

The signal lines G1-Gn and D1-Dm include a plurality of gate scanning lines G1-Gn transmitting row scanning signals, and a plurality of data lines D1-Dm transmitting data level signals. The scanning lines G1-Gn extend substantially in a row direction and are substantially parallel to each other. The data lines D1-Dm extend substantially in a column direction and are substantially parallel to each other. Each voltage line (not shown) transmits a reference driving voltage Vdd.

Figure 2:
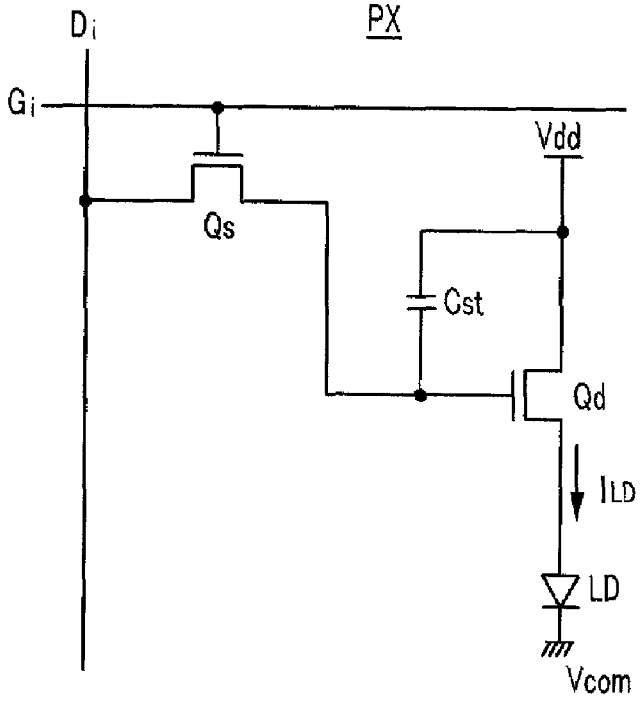
FIG. 2 is an equivalent circuit diagram for one pixel of an organic light emitting display device according to an exemplary embodiment.

Referring to FIG. 2, each pixel PX of the organic light emitting display device according to an exemplary embodiment; for example a pixel PX connected to the i-th scanning line Gi (i=1, 2, . . . , n) and the j-th data line Dj (j=1, 2, . . . , m), includes an organic light emitting diode LD, a driving transistor Qd, a charge storage capacitor Cst, and a switching transistor Qs.

Each of the switching transistor Qs and the driving transistor Qd according to an exemplary embodiment is a of an n-channel type field effect transistor (N-MOSFET). The gate electrode of the switching transistor Qs is connected to the scanning line Gi, the drain electrode thereof is connected to the data line Dj, and the source electrode thereof is connected to the gate electrode of the driving transistor Qd. The switching transistor Qs transmits a data voltage Vd applied to the data line Dj to the driving transistor Qd in response to a row-activating scanning signal applied to the scanning line Gi. The drain electrode of the driving transistor Qd is connected to the driving voltage Vdd, and the source electrode thereof is connected to the anode of the organic light emitting element LD. The driving transistor Qd conducts a driving current, ILD of which the magnitude is changed according to the voltage difference ($V_{gsQd}$) between the gate electrode and the source electrode of the Qd transistor.

The capacitor Cst is connected between the gate electrode and the drain electrode of the driving transistor Qd. The capacitor Cst charges to a potential corresponding to a difference between the data voltage applied to the gate electrode of the driving transistor Qd through the switching transistor Qs and the voltage Vdd. The capacitor Cst substantially maintains the potential charged thereto after the switching transistor Qs is turned-off to thereby uniformly maintain the data voltage.

The organic light emitting element LD has an electric diode characteristic such that it is equivalently displayed schematically as an organic light emitting diode. The organic light emitting diode LD has an anode connected to the source electrode of the driving transistor Qd and a cathode connected to a common voltage, Vcom. The organic light emitting diode LD emits light having an intensity depending on an output current ILD of the driving transistor Qd, thereby displaying images. The organic light emitting diode LD may emit a preselected one of the primary colors or the white color. An example of a set of the primary colors includes red, green, and blue, and a desired color is displayed with a spatially-adjacent combination of the three primary colors each driven to a desired intensity. If a white light of respective intensity is added to such synthesized light, the overall luminance increases. (However, the color impression may change.) Alternatively, the organic light emitting element LD of all pixels PX may emit light of a white color, but some of the pixels PX may further have a color filter (not shown) covering them and changing the white light that is emitted from the organic light emitting element LD to light of one of the primary colors.

Figure 3:
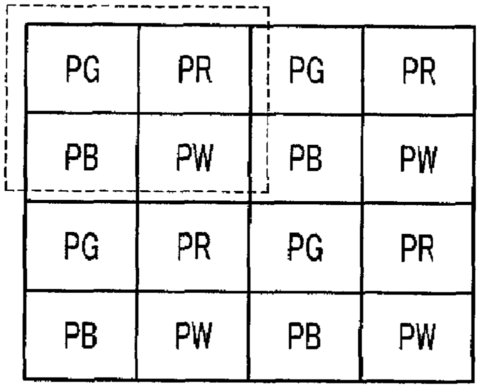
FIG. 3 is a view showing a plurality of pixels of an organic light emitting display device according to an exemplary embodiment.

Referring to FIG. 3, pixels PX (where X=R, G, B or W) for emitting a red color, a green color, a blue color, and a white color light, i.e., a red pixel PR, a green pixel PG, a blue pixel PB, and a white pixel PW, can be arranged in repeating 2×2 matrix form where the PW is in the bottom right corner but could alternatively be any other corner. The so-arranged 2×2 pixel set is refered to herein as an example of a four color dot "dot". An OLED display in accordance with the disclosure has a structure in which the dots are repeatedly disposed in row and column directions. The red pixel PR and the blue pixel PB are opposed to each other in a diagonal direction within each dot, and surround a PW pixel on its top, bottom, left and right sides. The green pixel PG and the white pixel PW are opposed to each other in a diagonal direction in each dot. It has been found that when the green pixel PG and the white pixel PW are opposed to each other in a diagonal direction in each dot, the OLED display appears to exhibit its best color characteristics to the human eye.

While the 2×2 matrix arrangement of FIG. 3 is preferred, other four color pixel sets that include white (e.g., PR, PG, PB, and PW) may be used and organized to have a linear stripe structure for example or a pantile structure as opposed to the mosaic arrangement of FIG. 3.

In one embodiment, as mentioned, the switching transistor Qs and the driving transistor Qd of each pixel PX are n-channel metal oxide semiconductor field effect transistors (MOSFETs) that are made of amorphous silicon or of polysilicon. However, at least one of the transistors Qs and Qd may be a p-channel MOSFET. Furthermore, the connection relationship of the transistors Qs and Qd, the capacitor Cst, and the OLED LD may be changed and need not be exactly as shown in FIG. 2.

Referring again to FIG. 1, the scan driver 400 applies scanning signals to the scanning lines G1-Gn where the supplied scanning signals (e.g., binary signals) have voltages including a high voltage, Von that is connected to the scanning lines G1-Gn of the display panel 300 to turn on the corresponding switching transistor Qs (render them conductive) and a low voltage Voff to turn off the switching transistor Qs.

The data driver 500 is connected to the data lines D1-Dm of the display panel 300 to apply data voltages (e.g., analog voltages) that represent a display image signal to the data lines D1-Dm.

The gray voltage generator 800 generates a plurality of gray voltages to output to the data driver 500. The data driver 500 may selectively pick from among the supplied plurality of gray voltages and/or interpolate between them so as to generate corresponding data voltage signals for application to the data lines. The gray voltages may be adjusted to be different for each color and in response to consideration of the light emitting efficiencies and lifetimes of the utilized light emitting materials in the PX pixels.

The signal controller 600 controls operations of the scan driver 400, the data driver 500, the gray voltage generator 800, etc.

Furthermore, the signal controller 600 includes a signal processor 650 that receives a three-color input image signal R/G/B, and generates a corresponding four-color output image signal R'/G'/B'/W therefrom where each of the R', G', and B' drive magnitudes is generally different from the original R, G, and B input magnitudes. Operations of the signal processor 650 will be described in greater detail below.

Each of the driving devices 400, 500, 600, and 800 may be directly mounted on the display panel 300 in a form of at least one IC chip, mounted on a flexible printed circuit film (not shown) to attach to the display panel 300 in a form of a tape carrier package (TCP), or mounted on a separate printed circuit board (PCB) (not shown). Alternatively, the driving devices 400, 500, 600, and 800 along with the signal lines G1-Gn and D1-Dm, and the transistors Qs and Qd, etc., may be monolithically integrated in the display panel 300. Furthermore, the driving devices 400, 500, 600, and 800 may be integrated in a single chip, and in this case at least one among them or at least one circuit element constituting them may be provided outside of the single chip.

Now, an operation of the OLED display will be described.

The signal controller 600 receives three-color input image signals R, G, and B and an input control signal that controls the display thereof from an external graphics controller (not shown). The three-color input image signals R, G, and B may be received as digital signals having respective OLED drive values (gray scale values) corresponding to desired luminance and chromiance of each dot based on three colors and based on the limited number of the grays that may be represented by the finite bits of each of the R, G, and B digital signals, for example 1024 ($=2^{10}$), 256 ($=2^8$), or 64 ($=2^6$). Luminance and drive signal magnitude are generally not the same thing. The luminance that each triad of gray values will provide may be given by a gamma curve associated with the specific display device. Converting the three-color input image signals R, G, and B or their gray drive magnitudes to a corresponding effective luminance value is called "gamma conversion". The input control signal includes, for example, a vertical synchronization signal Vsync, a horizontal synchronization signal Hsync, a main clock signal MCLK, and a data enable signal DE. The signal controller 600 includes the signal processor 650. When the entire region at which the images are displayed is divided into a plurality of regions in the display panel 300, the signal processor 650 converts the three-color input image signals according to one or more predefined partial expansion coefficients (PEC) for each of plural image regions to thereby generate corresponding four-color output image signals R', G', B', and W that generally have enhanced luminance. The partial extension coefficient (PEC) is a luminance extending factor that generally functions to increase luminance in a corresponding one of plural image regions and/or in a corresponding one of plural gamut regions of a gamut map. It will be seen that luminance cannot be increased uniformly for all theorectical gamut regions and therefore enhancement of luminance must be variably controlled. In the system of FIG. 1, a signal processor 650 extends the three-color input image signal R, G, and B according to a calculated partial extension coefficient (PEC) to thereby generate the corresponding four color image signals R', G', B', and W of each region. The signal processor 650 also calculates a distortion amount factor (DAF) representing a distortion of color impression due to the luminance change provided by a first partial extension coefficient (PEC1). This distortion amount factor (DAF) is used to add compensation to the generated four color image signals (whose compensated versions may be denoted as @R''', G''', B''' and W'''). The signal processor 650 converts the three-color input image signal R, G, and B corresponding to each region according to a second compensated partial extension coefficient (PEC2) into the four-color output image signal R''', G''', B''' and W''' of a corresponding luminance control region. The second extension coefficient is a function of the distortion amount factor (DAF) and it is used for determining the degree of intensity extension applied to the red, green, and blue light emissions as well as to the luminance of the white color pixel to thereby improve the luminance of the images displayed by the 4c-OLEDD.

In terms of more detail, if there were no white color pixel present in a given dot, then there would be a first level of maximum luminance ($L_0$) that can be provided by just the light emitters (OLEDS) of the three primary color pixels (e.g., R, G, B) in the dot. For sake of example, the first or base level of maximum luminance ($L_1$) can be represented as a normalized vector: 1,1 which is seen in the gamut map of FIG. 6. On the other hand, when the white color pixel is added to the dot and it provides a maximum supplement of white light emission, WS; then a second or fully extened level of maximum luminance ($L_2$) that can be provided by the dot may be represented as a normalized vector: (1+WS), (1+WS); which is also seen in the gamut map of FIG. 6. The ratio of the maximum luminance that can be provided when the white color pixel is present relative to the total luminance in the case that only the luminance of the three color pixels are maximized is called the full extension coefficient (FEC={(1+WS), (1+WS)}/1,1). Stated more simply, the maximum luminance that can be output by a dot of the 4c-OLEDD is equal to the maximum luminance that can be output by just the three color pixels plus the maximum luminance that can be output by just the white pixel. The base maximum luminance ($L_0$) is therefore increased by the supplementing luminance of the white color pixel.

However, as mentioned, it is not always a good idea to increase each input 3-color signal (R, G, B) by the maximum or full extension coefficient (FEC={(1+WS), (1+WS)}/1,1) because this may adversely affect color impression, In the embodiment of FIG. 1, the signal processor 650 determines a partial extension coefficient (PEC≦FEC) by first determining a degree of distortion that would be added to the original color impression of the original 3-color input signal (R, G, B). This done by dividing the display panel into a plurality of image regions. As above-described, the distortion of an input color impression is generally produced when the three-color input image signal (R, G, and B) essentially defines a pure color (e.g., yellow; as red plus green only) which does not itself contain a white componet (e.g., white=R+G+B). In such a case adding a white extension component to an original color impression that has no pure white component distorts the color impression of that dot.

In accordance with one aspect of the present disclosure, the partial extension coefficient (PEC) in each of divided image regions (luminance control regions) is compensated for by respectively considering the degree of distortion of color impression in each image region depending on whether pure primary colors (no white component) are displayed in that region and accordingly adjusting the partial extension coefficients (PEC) for each of the divided image regions such that the maximum allowed luminance of a region in which a pure color is not predominantly displayed is larger than the maximum allowed luminance of a region in which a pure color is predominantly displayed. Accordingly, even when a pure color is predominantly displayed in one image region (luminance control region), the luminance of the images that are totally displayed in the display panel 300 can still be enhanced if pure colors are not predominantly displayed in other regions of the same display screen and the toal luminance is thus more increased than what was believed possible in the conventional art.

When including the white color pixel in each dot, not only is the overall luminance of the dot increased compared with the luminance of a three colors only organic light emitting dot, but also the per OLED magnitude of drive current applied to each of the three color pixels may be decreased if a nonpure color (a white containing color) is displayed and part or all of the burden of generating the white component is placed on the white color pixel. Since the lifetime of the organic light emitting diode (OLED) generally corresponds directly to the magnitude of drive current flowing through the OLED over time, if smaller currents are caused to flow through each OLED when displaying a given luminance, the lifetimes of the individual organic light emitting diodes (LD) may be increased and prevention or reduction of damage to the organic light emitting diodes may be obtained as well as possible reduction of power consumption because each OLED is operating at a lowere powered part of its I versus V curve (current versus voltage).

In FIG. 1, the signal controller 600 generates gate control signals CONT1, data control signals CONT2, and gray control signals CONT3, sends the gate control signals CONT1 to the gate driver 400, and sends the four compensated color image signals R''' G''', B''' and W''' and the data control signal CONT2 to the data driver 500.

The scan control signal CONT1 includes a scanning start signal, STV for instructing to start scanning, and at least one gate clock signal for controlling the output time of the gate-on voltage Von. The scan control signal CONT1 may further include at least one output enable signal OE for defining the duration time of the gate-on voltage Von The data control signals CONT2 include a horizontal synchronization start signal, STH for informing of start of transmission of the compensated four-color output image signal R''' G''', B''' and W''' of one pixel row, a load signal LOAD for instructing to apply the analog data voltages generated by converting the digital four-color image signal to the data lines D1-Dm, and a data clock signal HCLK.

Responsive to the data control signals CONT2 from the signal controller 600, the data driver 500 receives the four-color output image signal R''' G''', B''' and W''' and converts the four-color output image signal R''' G''', B''' and W''' into analog data voltages.

The scan driver 400 converts the scanning signal applied to the scanning lines G1-Gn in response to the scanning control signals CONT1 from the signal controller 600.

Thus, the switching transistors Qs of the corresponding pixel row are turned on, and the driving transistor Qd receives the corresponding data voltage through the turned on switching transistor Qs. Each driving transistor Qd outputs the driving current ILD corresponding to the applied data voltage to the organic light emitting element LD. Accordingly, the organic light emitting element LD emits the light of the magnitude corresponding to the driving current ILD.

By repeating this procedure by a unit of a horizontal period (also referred to as "1H" and that is equal to one period of the horizontal synchronization signal Hsync and the data enable signal DE), all scanning signal lines $G_1$-$G_n$ are sequentially supplied with the high turn-on voltage Von one at a time, thereby applying the data signals to all pixels PX to display an image for a frame.

Next, the signal processor 650 according to an exemplary embodiment will be described in greater detail with reference to FIG. 3 to FIG. 7.

Figure 4:
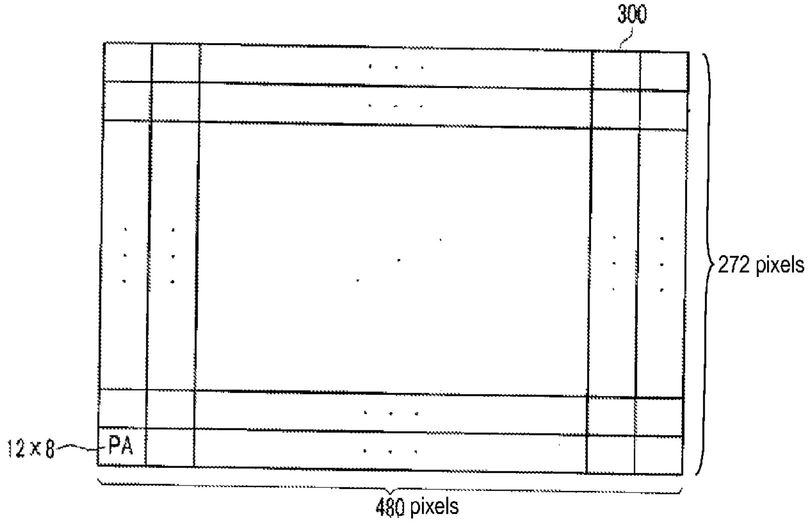
FIG. 4 is a view showing a plurality of regions of a display panel according to an exemplary embodiment.

FIG. 4 is a view showing a plurality of regions of a display panel 300 according to an exemplary embodiment of the present invention.

As shown in FIG. 4, when the total number pixels of the display panel 300 according to an exemplary embodiment is 480×272 pixels. In one embodiment, the display screen is subdivided into luminance control regions where one region comprises 96 pixels (this corresponding to a rectangle of 12×8 PA (pixel areas) or 3×2 dots. Thus, the 480×272 display panel 300 is subdivided into 40×34 luminance control regions. The signal processor 650 according to an exemplary embodiment generates a plurality of partial extension coefficients (PECs) each corresponding to one of the plurality of luminance control regions, and converts the three-color input image signals corresponding to each region into the four-color output image signals of each region. Here, the partial extension coefficients (PECs) are respectively interpolated relative to the whole display panel so that when a plurality of three-color input image signals are converted in accordance with the interpolated PECs, they generate smoothed out four-color output image signals for the whole of the screen. For convenience of explanation in FIG. 4, the luminance control regions made of a 12×8 plurality of pixels is considered. However, the present disclosure is not limited thereto. One luminance control region of the display panel may be instead be made of just two dots if not more.

A method for converting the three-color input image signals into the four-color image signals by the signal processor 650 according to an exemplary embodiment will now be described with reference to FIG. 5 to FIG. 7.

Figure 5:
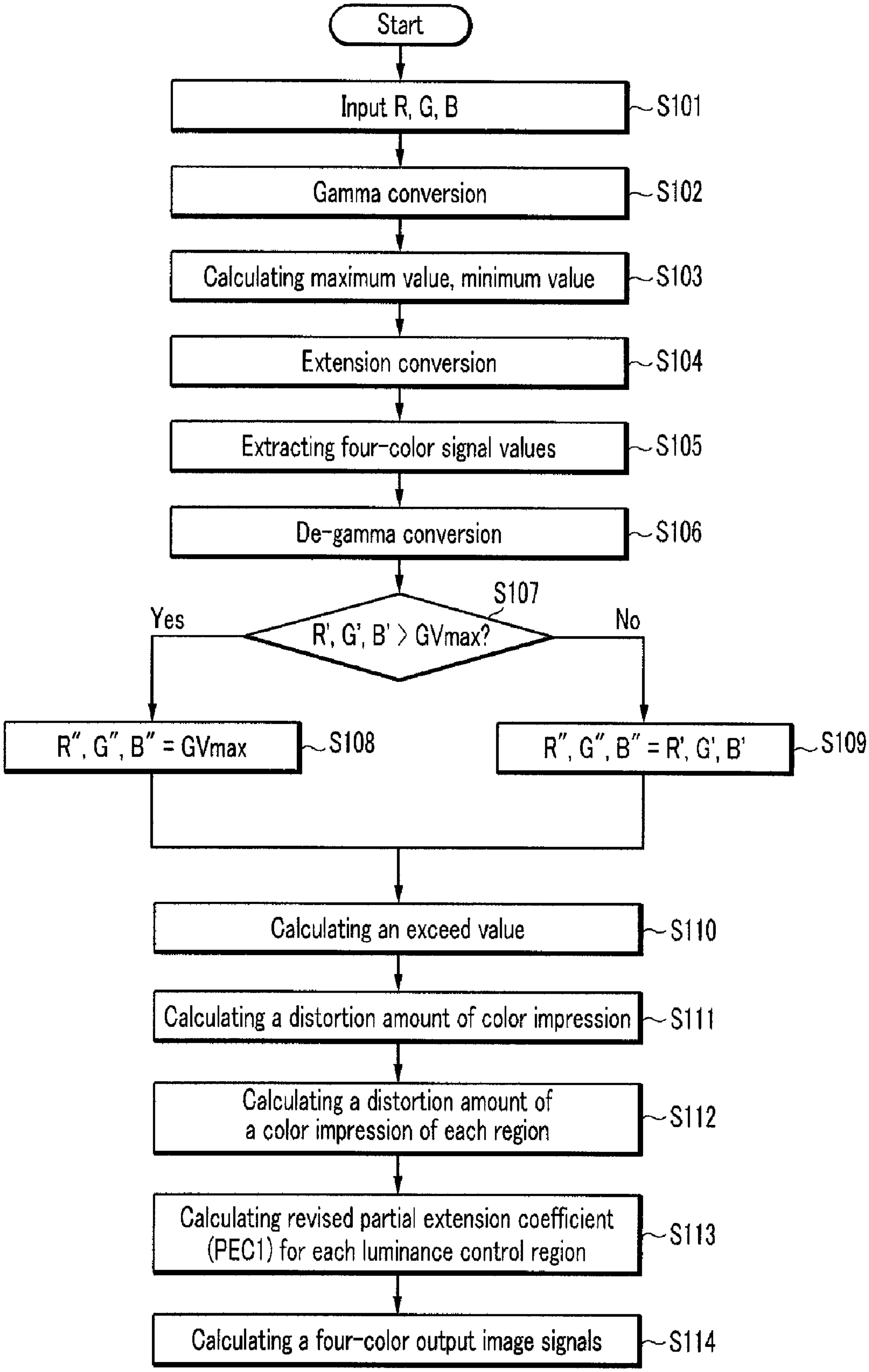
FIG. 5 is a flowchart showing a method for converting three-color image signals into four-color image signals in a signal processor according to an exemplary embodiment.

FIG. 5 is a flowchart showing a method for converting three-color image signals into four-color image signals corresponding to one luminance control region according to an exemplary embodiment. It is to be understood that FIG. 5 is a flowchart of an algorithm that may be executed in signal processor 650 according to an exemplary embodiment.

Referring to FIG. 5, the red, green, and blue image signals R, G, and B of one input dot are assumed to have respective drive magnitudes or gray values of GR, GG, and GB at input step (S101). In input step (S102) the input image drive signals R, G, and B of one input dot are gamma converted according to a predefined gamma convertion function Γ( ):

$$r=\Gamma(GR)$$

$$g=\Gamma(GG)$$

$$b=\Gamma(GB).$$

As known to those skilled in the art, gamma conversion means that the gray values GR, GG, and GB of the input image signals are converted into corresponding luminance values r, g, and b corresponding to the gray values GR, GG, and GB that are used to drive the respective R, G, and B emmiters.

$$X=\alpha GV^{\gamma} \quad \text{(Equation 1)}$$

In Equation 1, X is a luminance value of the signal, GV is a gray value of the input signal, and γ is a predefined gamma constant and α is a predefined gain constant. For the inverse function, the luminance values X is de-gamma converted to obtain the corresponding gray value, GV. The de-gamma conversion may be expressed by the following Equation 2.

$$GV=\alpha' X^{1/\gamma} \quad \text{(Equation 2)}$$

The above Equations 1 and 2 are ideal, and the modeled gamma curve of the organic light emitting display element in practice may be a more complicated function than what is portrayed above. The basic concepts hold even though it is understood that gamma conversion and de-gamma conversion functions may be more complex than the exemplary functions provided here.

Next, in third step (S103), the maximum luminance value and the minimum luminance value among the received three luminance values: r, g, and b of the given dot are determined. That is to say, $$M1=\text{Max}(r, g, b) \quad \text{(Equation 3)}$$

$$M2=\text{Min}(r, g, b) \quad \text{(Equation 4)}$$

are obtained. Here, Max(x, y, . . . ) means the maximum value among x, y, . . . , is output and Min(x, y, . . . ) means the minimum value among x, y, . . . is output.

Next, the luminance values r, g, and b of the image signals are extension-wise converted by multiplying them with a first partial extension factor, (1+PE) where PE>0 thus increasing the luminance values r, g, and b of the originally input image signals by a corresponding first partial extension coefficient (PEC) in step (S104).

Figure 6:
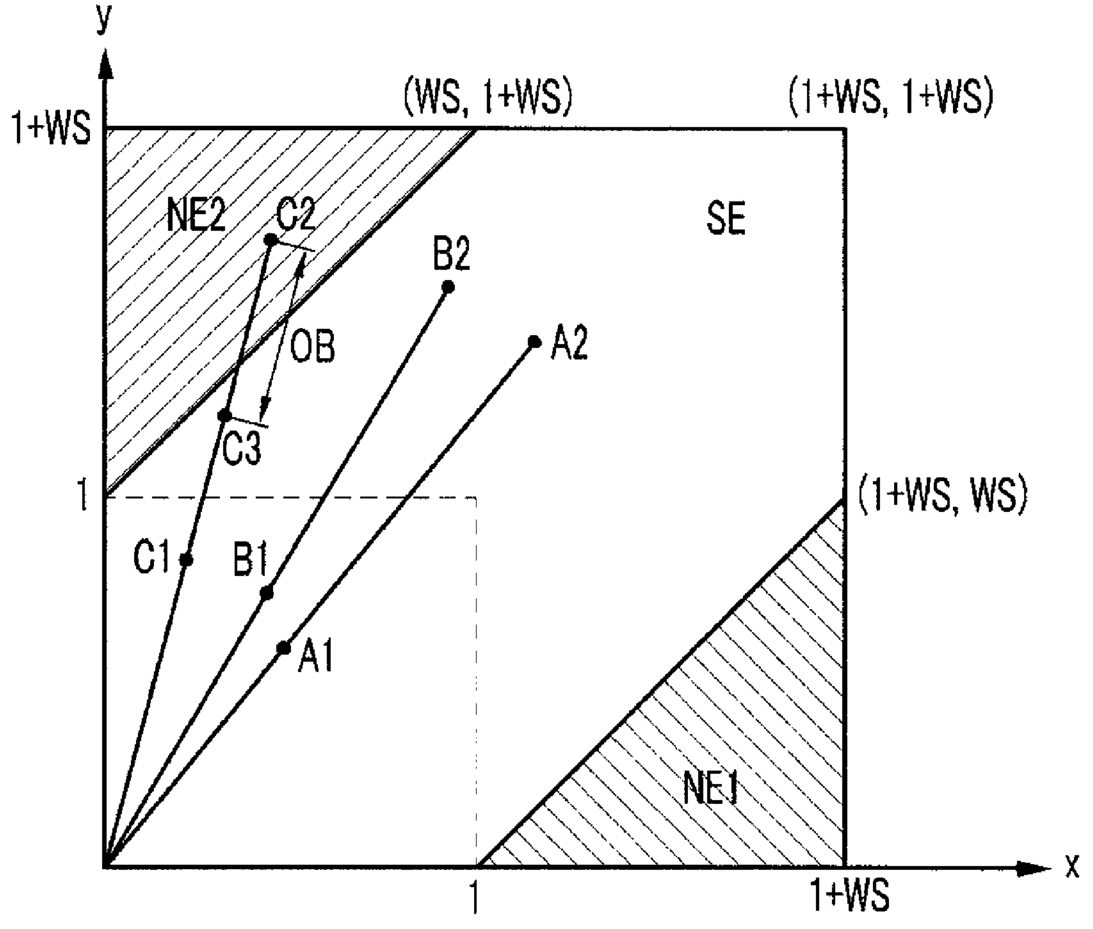
FIG. 6 is a graph showing the expansion of the luminance values of image signals when converting three-color input image signals into four-color output image signals according to an exemplary embodiment.

FIG. 6 is a 2 dimensional gamut-and-luminance map showing how the expansion of luminance vectors of image signals may be thought of when converting three-color image vectors (e.g., A1, B1, C1) into corresponding four-color image vectors (e.g., A2, B2, C3). In FIG. 6, the horizontal axis (x) and the vertical axis (y) represent the normalized luminance of two selected pure colors, say red and green. In one embodiment, the selected two pure colors are those for which the minimum value M2 x axis), the maximum value M1 (y axis), in step S103 were determined. The 1×1 dashed square represents the gamut available with just the selected two pure colors. This is a normalized luminance and gamut space. That is to say, when the input image drive signals R, G, and B are signals of 8 bits apiece, the grays and the luminance represented by the 8-bit image signals R, G, and B have 256 generally nonlinear steps from a 0-th to a 255-th. If these are normalized, they become 0, 1/255, 2/255, . . . , 254/255, 1 steps. For example, if the luminance associated with a red drive signal R is 255/255, and the luminance associated with a green drive signal G is 100/255 and the luminance associated with a blue drive signal B is 60/100, then the luminance of the blue signal B will be deemed smallest by the MIN and MAX functions, while the luminance of the red signal R will be deemed is largest by the MIN and MAX functions. In FIG. 6 an input RGB signal having luminance values 255/255, 100/255 and 60/100 will appear as point whose x coordinate is 60/255 and whose y is 255/255 (=1) and this exemplary point—which is not shown in FIG. 6—would appear on the area of the 1×1 dashed square as opposed to appearing in a an extended area outside he 1×1 dashed square.

Generally, when the white color pixel is not present to provided supplemental white light, luminance of the input color point may be mapped inside the dashed square defined by coordinate points (0,0), (0,1), (1,1), and (0,1). Here, if the white color pixel is added, the luminance and gamut region of the color that can be possibly expressed takes on a hexagonal shape defined by coordinate points: (0,0), (1,0), (1+PW, PW), (1+PW,1+PW), (PW, 1+PW), and (0, 1) such that the 3-colors-only dashed square is basically extended in the (1, 1) direction by a diagonal extension coefficient WS. Again, so to speak, the given red, green, and blue image signals may be diagonally enlarged by a factor of (1+PW). However, there is a region of the illustrated gamut map where enlargement is not possible or is undesirable. The not-allowed first triangle, NE1 made of corner points (1, 0), (1+PW, 0), and (1+PW, PW) and the not-allowed second triangle NE2, made of corner points (0, 1), (PW, 1+PW), and (0, 1+PW) are disallowed regions in the four-color organic light emitting device because extension into NE1 or NE2 either causes too much distortion of color impression and/or because the OLEDs cannot be safely driven to obtain that luminance output. A disallowed region is generally a region in which the strong pure color is predominantly represented. When the image signal is extension-wise converted with the ratio of (1+PW), if the resultant color lies in either of the two triangle regions, NE1 and NE2, then the partial extension coefficient should be reselected to have a different, lower ratio in substitution for the (1+PW) factor through appropriate conversion. Generally, the partial extension coefficient PW should be decreased for a signal that at first is extensionally converted to lie in one of the two not-allowed triangle regions, NE1 and NE2.

For example, the luminance points, A1 and B1, which are represented by two similarly colored pairs among the three-color input image signals in FIG. 6, are respectively and extension-wise converted into the points A2 and B2 from the starting point (0, 0) by the 1+PW per-axis multiplying factor being applied to each pure color axis, this will increase the distance between the points A1 and B1, and the starting point (0, 0) according to the straight line vectors connecting the points A1 and B1 to the starting points 0 and 0 (the origin) and extending to respective points A2 and B2. That is to say, the M1 and M2 vector components are extensionally convertible into the M1 and M2 vector components (1+PW)*M1 and (1+PW)*M2 as long as the results of this first extension attempt do not end up lying in the not-allowed triangle regions, NE1 and NE2.

The luminance results of the initial expansion conversion are as follows.

$$r'=(1+WS)r \quad \text{(Equation 5)}$$

$$g'=(1+WS)g \quad \text{(Equation 6)}$$

$$b'=(1+WS)b \quad \text{(Equation 7)}$$

Next, the luminance values of the three-color image signals including the luminance values w of a white image signal are extracted.

The luminance value, w of the luminance-supplemanting white color image signal is determined according to yes or no satisfaction of the following Equation 8.

$$M1*WS\leqq(1+WS)*M2, \text{ where } M1 \text{ and } M2 \text{ are pre-extension } y \text{ and } x \text{ coordinates.} \quad \text{(Equation 8)}$$

In other words, y/x<(1+ws)/ws.

In the case of satisfying Equation 8, $$w=M1*WS \text{ (This meaning that } w \text{ is guaranteed to satisfy } w\leqq(1+WS)*M2). \quad \text{(Equation 9)}$$

Otherwise, $$w=M2*(1+WS) \text{ (This meaning that } w \text{ is still guaranteed to satisfy } w\leqq(1+WS)*M2). \quad \text{(Equation 10)}$$

That is to say, the smallest value, M2*(1+WS) among the conversion wise extendible luminance values (r, g, b) is determined as the supplementing luminance value, w of the white signal.

In additional, the luminance value w of the white signal may be determined by various other methods. For example, the luminance value w of the white signal may instead be determined as the minimum value M2, or the luminance value w of the white signal may be determined by Equation 10 regardless of the satisfaction of Equation 8.

Next, the once-extended luminance values of red, green, and blue image vectors (r', b', g') are reduced by subtracting away the approximate luminance supplement provided by the w value of the white signal (S105).

$$r''=r'-w \quad \text{(Equation 11)}$$

$$g''=g'-w \quad \text{(Equation 12)}$$

$$b''=b'-w \quad \text{(Equation 13)}$$

Then, the resultant luminance values r'', g'', b'', and w of the red, green, blue, and white image vectors are de-gamma converted (step S106) to obtain the gray drive values for each of the white, red, green, and blue image drive signals.

$$GR'=\Gamma^{-1}(r'') \quad \text{(Equation 14)}$$

$$GG'=\Gamma^{-1}(g'') \quad \text{(Equation 15)}$$

$$GB'=\Gamma^{-1}(b'') \quad \text{(Equation 16)}$$

Next, in step S107, it is determined whether the de-gammaed gray values GR', GG', and GB' of the red, green, and blue image signals are higher than the maximum possible gray drive value, for example higher than the 255-th gray value, GVmax among the zero-th to 255-th grays.

$$GR', GG', GB'>GVmax? \quad \text{(Equation 17)}$$

If Equation 17 is satisfied for any of the gray values, the corresponding result of Equation 14 to Equation 16 is replaced by GVmax (saturation step S108). However, if Equation 17 is not satisfied, the corresponding result obtained in Equation 14 to Equation 16 is maintained (step S109).

Here, satisfying Equation 17 indicates, for example as shown in FIG. 6, that an attempt has been made to extend a point like C1 for example into becoming a point like C2 that lies in the irreproducible area NE1. Since this is not possible, the initial extension attempt is retracted to (taken back to) a less extended point C3 of the reproducible area CE in saturation step S108. Since the saturation step S108 does not always retract along a straight line relative to the original extension vector (e.g., C1 to C2), the saturation step S108 is considered to have distorted the color impression. The distortion amount of the color impression may be calculated as follows.

Firstly, the difference between the points C3 and C2 that are respectively disposed in the reproducible area CE and the irreproducible areas NE1 and NE2, that is, the excess amount or over-brightness, OB, over the highest gray GVmax, is calculated (S110). The gray of each image signal may be calculated as follows.

$$OBR=GR'-GV\text{max} \quad \text{(Equation 18)}$$

$$OBG=GG'-GV\text{max} \quad \text{(Equation 19)}$$

$$OBB=GB'-GV\text{max} \quad \text{(Equation 20)}$$

In one embodiment, the distortion amount of the color impression due to over-brightness (OB) is calculated for the red, green, and blue image signals R, G, and B of one dot by adding all the squares of the excess amounts (if any) like Equation 21 (S111).

$$Ce=OBR^2+OBG^2+OBB^2 \quad \text{(Equation 21)}$$

This is just one possible method for modeling the distortion effect due to over-brightness (OB). Numerous other summing methods may be used in its place. For example, to increase the modeled amount of distortion to the color impression, the cube values and/or the values of more than the squares of each of the over-brightness (OB) magnitudes may be added together, and/or linear combinations of the over-brightness (OB) values may be added so as to avoid the computational overhead of the square calculations.

The total distortion amount, TCe of the color impression of each luminance control region may be calculated through this method. In one embodiment, the total distortion amount TCe of the color impression of each luminance control region may be calculated by summing the over-brightness distortion amounts Ce of the color impressions of the three-color input image signals in the given luminance control region. @@@After the calculation of the distortion amount of the color impression for the one set of image signals of red and blue of one dot as in Equation 21, the distortion amount of the color impression for each region is calculated (S111). The distortion amount CE of the color impression of each region is calculated by summing the distortion amount Ce of the color impression of each region as in Equation 22 (S112).

$$TCe=\Sigma Ce \quad \text{(Equation 22)}$$

The signal processor 650 amends the partial extension coefficient PW of each region according to the calculated distortion amount CE of the color impression of each region into the appropriate range to calculate the partial extension coefficient PW (S113). The corresponding relationship between the distortion amount CE of the color impression and the partial extension coefficient PW according to an exemplary embodiment of the present invention is determined by using the pre-extracted value through the experimental method. DeletedTexts They are made as a look-up table, and the signal processor 650 may store the look-up table. After amending the partial extension coefficient PW extracted from the look-up-table by using interpolation, the partial extension coefficient PW is finally generated. The signal processor 650 amends by interpolating the partial extension coefficient PW of the corresponding region under the consideration of the whole display panel. If the partial extension coefficient PW is amended according to the interpolation, a partial extension coefficient PW having a different value according to each address AD in the same region is generated.

The signal processor 650 calculates the four-color output image signals R", G", B", and W' according to the partial extension coefficient PW for each address AD generated in this way (S114). The four-color output image signal R", G", B", and W' is obtained through the repeated execution of S104 to S106 by using the partial extension coefficient PW according to each address AD.

In the organic light emitting display device according to an exemplary embodiment of the present invention, the input image signal of every frame is extensionally converted by using the partial extension coefficient PW determined by the predetermined value, and the distortion amount of the color impression is calculated according to each region to amend the partial extension coefficient PW according to the calculated distortion amount of the color impression. Here, the partial extension coefficient PW of the current frame before the amendment (hereinafter referred to as 'the initial partial extension coefficient') may be determined by averaging the partial extension coefficients PW of the regions that are calculated in the previous frame.

Alternatively, the partial extension coefficients PW corresponding to each region of the previous frame may be determined as the initial partial extension coefficient PW of the region of the current frame image.

Figure 7:
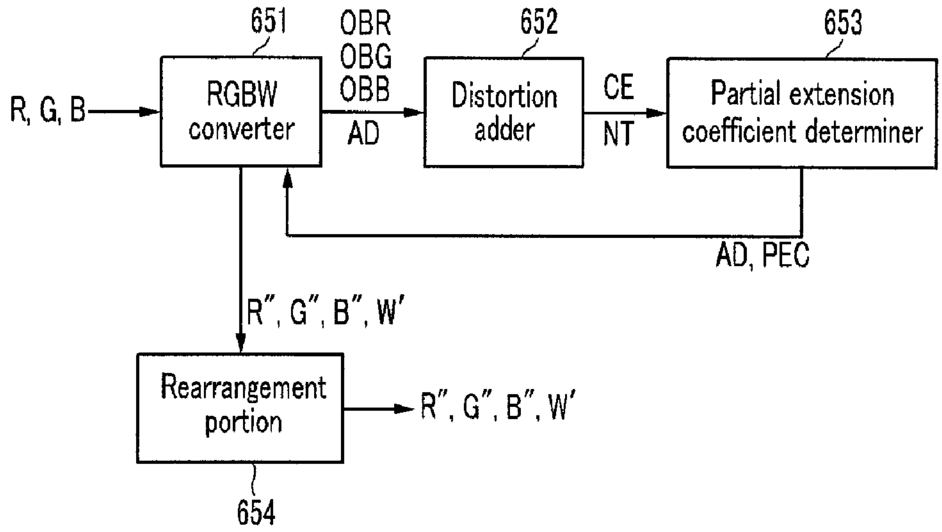
FIG. 7 is a block diagram of a signal processor according to an exemplary embodiment.

FIG. 7 is a block diagram of a signal processor according to an exemplary embodiment of the present invention. Referring to FIG. 7, a signal processor 650 of an organic light emitting display device according to an exemplary embodiment of the present invention receives a plurality of three-color input image signals R, G, and B from the external and generates one white color output image signal W' and a three-color output image signal R", G", B' from each three-color input image signal R, G, and B.

The signal processor 650 includes a RGBW converter 651, a distortion adder 652, an extension coefficient determiner 653, and a rearrangement portion 654.

The RGBW converter 651, if the three-color input image signal R, G, and B is input, gamma converts it, and calculates a maximum value M1 and a minimum value M2. The RGBW converter 651 extracts the luminance values r', g', and b' including the luminance value w of a white image signal by using an initial partial extension coefficient PW with a predetermined value. As above-described, the RGBW converter 651 according to an exemplary embodiment of the present invention uses the partial extension coefficient PW with the predetermined value, or may use an average value of the partial extension coefficient PW of the previous frame or the partial extension coefficient PW of the partial region as the initial partial extension coefficient PW of the current frame. Furthermore, the RGBW converter 651 respectively determines the rest in which the luminance value w of the white color signal extracted from the extension-converted values r', g', and b' is subtracted as the luminance values r", g", and b" of red, green, and blue image signals. The RGBW converter 651 calculates the gray values GR', GG', GB', and GW of the four-color image signal generated by digamma converting the luminance values r", g", b", and w of red, green, blue, and white image signals. The RGBW converter 651 determines whether the gray values GR', GG', GB', and GW of the four-color image signals exceeds the maximum gray value GVmax to calculate the excess amounts OBR, OBG, and OBB per each image signal based on Equation 21, and transmits the address AD representing the position of the pixel at which the gray value GR', GG', GB', and GW of the four-color image signal is displayed and the excess amounts OBR, OBG, and OBB per each image signal to the distortion adder 652. Also, the RGBW converter 651 receives the address AD input from the partial extension coefficient determiner 653 and the partial extension coefficient PW corresponding to the address, and repeats S104, S105, and S106 of FIG. 5 according to the partial extension coefficient PW to extract the input image signal R, G, and B as a four-color output image signal R", G", B", and W'. The RGBW converter 651 outputs the converted four-color output image signal R", G", B", and W' to the rearrangement portion 654.

The distortion adder 652 receives the exceed amounts OBR, OBG, and OBB per each image signal to calculate the distortion amount CE of the color impression for each region based on Equation 22. The distortion adder 652 recognizes the address to determine whether the calculated distortion amount CE of the color impression is included to the region among the plurality of display areas, and transmits a region discernment signal NT of the determined region and the calculated distortion amount CE of the color impression to the partial extension coefficient determiner 653. The region discernment signal NT is a signal that is respectively established for every region to respectively discriminate a plurality of regions of the display panel 310.

The partial extension coefficient determiner 653 extracts the partial extension coefficient PW from the look-up table corresponding to the distortion of the color impression CE, and compensates the extracted partial extension coefficient through interpolation to determine the partial extension coefficient PW. The partial extension coefficient determiner 653 transmits the address AD along with the amended partial extension coefficient PW corresponding to the address to the RGBW converter 651. The partial extension coefficient determiner 653 may store the address of the image signal and the partial extension coefficient PW by mapping. The stored partial extension coefficient PW corresponding to the address may be determined as the initial partial extension coefficient PW when converting the three-color input image signal of the following frame. For this, the partial extension coefficient determiner 653 may further include a memory (not shown) for storing the partial extension coefficient (PW) according to each address.

The rearrangement portion 654 appropriately arranges the input four-color output image signal R", G", B", and W' according to the arrangement of the pixels positioned to the display panel 300 to store the four-color output image signal R", G", B", and W'. The rearrangement portion 654 transmits the stored four-color output image signal to the data driver 500.

Accordingly, the partial extension coefficient becomes different according to each region such that it is not needed to reduce the extension coefficient of the entire region to represent the pure color, thereby increasing the overall luminance. Also, the amount of the current input to each organic light emitting diode through the increasing of the overall luminance is reduced such that the lifetime of the organic light emitting diode may be improved and the consumption power may be reduced.

Next, a signal processor 650' according to another exemplary embodiment of the present invention will be described with reference to FIG. 8 and FIG. 9.

Figure 8:
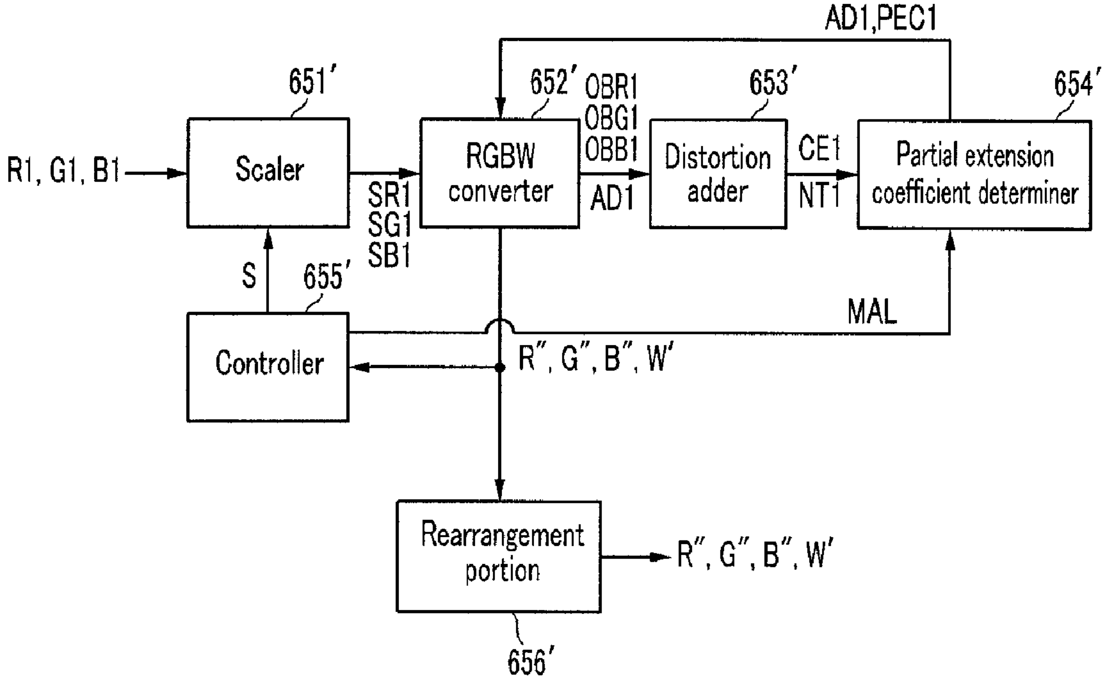
FIG. 8 is a block diagram of a signal processor according to another exemplary embodiment.

FIG. 8 is a block diagram showing a signal processor 650' according to another exemplary embodiment of the present invention. A signal processor 650' according to another exemplary embodiment of the present invention converts the magnitude of the three-color input image signal R1, G1, and B1 by using a scale factor S, differently from the above-described exemplary embodiment, and generates a four-color image signal R1', G1', B1', and W1 by using the converted three-color input image signal. Thus, the total current amount TC of one frame image is extracted from the plurality of four-color image signals R1', G1', B1', and W1 of one frame unit. If the extracted current amount TC derivates from the predetermined range, the partial extension coefficient PW1 and the scale factor S are compensated for the total extracted current amount of one frame image to be included in the predetermined range. The scale factor S, as the value to limit the current flowing in the organic light emitting element, may have a value between 0 to 1. The predetermined range includes a range corresponding to the predetermined ration for the maximum current amount that may flow according to the image signal of one frame unit. This may be determined by considering the lifetime and the consumption of the organic light emitting diode through the experiment methods.

As shown in FIG. 8, the signal processor 650' according to another exemplary embodiment of the present invention includes a scaler 651', an RGBW converter 652', a distortion adder 653', a partial extension coefficient determiner 654', a controller 655', and a rearrangement portion 656'.

The scaler 651' receives a plurality of three-color input image signals R1, G1, and B1 from the external and converts them into a plurality of three-color conversion image signals sR1, sG1, and sB1 according to the scale factor S input from the controller 655'. The three-color conversion image signal sR1, sG1, and sB1 as the signal of which the magnitude of the three-color input image signal R1, G1, and B1 is changed according to the scale factor S has the value of which the scale factor S is multiplied by the three-color input image signal R1, G1, and B1 in the present exemplary embodiment. The method in which the input image signal R1, G1, and B1 is changed according to the scale factor S may be changed according special functions, differently from the present exemplary embodiment.

The RGBW converter 652' receives the three-color conversion image signal sR1, sG1, and sB1 output from the scaler 651', and extension-converts the three-color conversion image signal sR1, sG1, and sB1 corresponding to each region according to the initial partial extension coefficient PW1 to generate a four-color image signal R1', G1', B1', and W1. The method in which the three-color conversion image signal sR1, sG1, and sB1 is converted into the four-color image signal R1', G1', B1', and W1 is the same as S102-S106 of the above-described exemplary embodiment of the present invention. The RGBW converter 652' determines whether the gray values GR1', GG1', GB1', and GW1 of the four-color image signal exceed the maximum gray value GVmax and calculates the excess values OBR1, OBG1, and OBB1 per each image signal on the basis of Equation 21, then transmits an address AD1 representing the position of the pixel displaying the gray values GR1', GG1', GB1', and GW1 of the four-color image signal and the excess values OBR1, OBG1, and OBB1 per each image signal to the distortion adder 653'. Also, the RGBW converter 652' receives the input address AD1 and the partial extension coefficient PW1 corresponding to the address from the partial extension coefficient determiner 654', and repeats S104-S106 of FIG. 6 according to the partial extension coefficient PW1 to extract the input image signal R1, G1, and B1 as the four-color output image signal R1", G1", B1", and W1'. The RGBW converter 652' outputs the converted four-color output image signal R1", G1", B1", and W1' to the rearrangement portion 656'.

The distortion adder 653' receives the excess values OBR1, OBG1, and OBB1 per each image signal, and calculates the distortion amount CE1 of the color impression for each region on the basis of Equation 22. The distortion adder 653' recognizes the address to determine whether the calculated distortion amount CE1 of the color impression corresponds to the region among the plurality of display areas, and transmits the region discernment signal NT1 and the distortion amount CE1 of the color impression corresponding thereto to the partial extension coefficient determiner 654'.

The partial extension coefficient determiner 654' extracts the partial extension coefficient PW1 from the look-up table corresponding to the distortion amount CE1 of the color impression, and amends the extracted partial extension coefficient through interpolation to determine the partial extension coefficient PW1. The partial extension coefficient determiner 654' transmits the address AD1 and the amended partial extension coefficient PW1 corresponding to the address AD1 to the RGBW converter 651. The partial extension coefficient determiner 654' controls for the partial extension coefficient PW1 to not exceed the maximum extension coefficient MAL. The maximum extension coefficient MAL is the maximum value that the partial extension coefficient PW1 may have, and the controller 655' controls the value thereof according to the current amount TC. The partial extension coefficient determiner 654' controls that the plurality of partial extension coefficients PW1 respectively corresponding to the distortion amount CE1 of the color impression in the lookup table do not exceed the maximum extension coefficient MAL. That is to say, the maximum extension coefficient MAL of the four-color organic light emitting display device according to another exemplary embodiment of the present invention is a factor that is controlled along with the scaler factor S to limit the current amount TC of one frame.

The rearrangement portion 656' appropriately arranges the input four-color output image signal R1", G1", B1", and W1' according to the structure of the pixel of one dot to the data driver 500.

Next, a method for controlling the controller 655', the scale factor S, and the maximum extension coefficient MAL will be described in detail with reference to FIG. 9.

Figure 9:
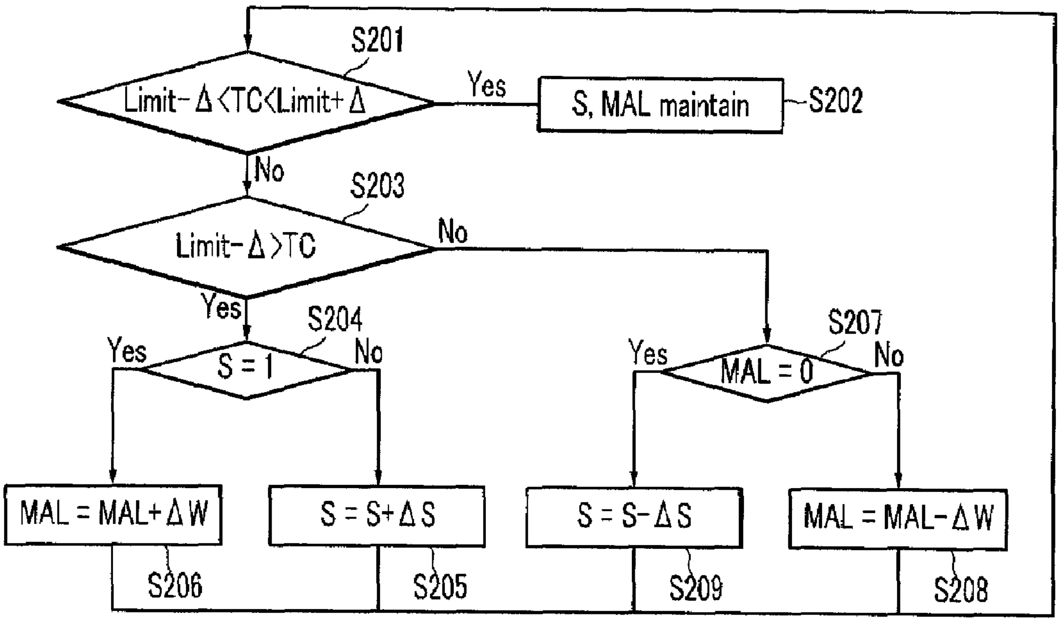
FIG. 9 is flowchart showing a method for compensating a scale factor (S) and a maximum expansion coefficient (MAL) of a controller in a four-color organic light emitting display device according to another exemplary embodiment.

FIG. 9 is flowchart showing a method for compensating a scale factor (S) and a maximum expansion coefficient (MAL) of a controller 655' in a four-color organic light emitting display device according to another exemplary embodiment of the present invention.

The controller 655' estimates the total current amount TC of one frame image from the four-color output image signal R", G", B", and W' of one frame unit which is output to the RGBW converter 652'. The controller 655' may estimate the total current amount TC by using the look-up table in which the corresponding current values according to the four-color output image signals are stored. The controller 655' compares the estimated total current amount TC with the predetermined range (S201). Here, the predetermined range is a range in which a permit limit value is considered in the entire range of the reference current amount Limit, and the range of the reference current amount Limit of the present exemplary embodiment is from 15% to 30% of the maximum current amount of one frame. Therefore, it is determined whether the current amount TC is more than 15%−Δ or less than 30%+Δ.

On the other hand, the permit limit value Δ is generally determined in the range value of 2-5%, and considers the error range of the reference current amount Limit. The present invention is not limited thereto, and the above-described number is merely one example.

When the value of the current amount TC is in the above-described predetermined range, the scale factor S and the maximum extension coefficient MAL are not changed and are output with the same values (S202). Here, the scale factor S is output to the scaler 651', and the maximum extension coefficient MAL is output to the partial extension coefficient determiner 654'.

In the present exemplary embodiment, the scale factor S of the initial state is determined as 1 and the maximum extension coefficient MAL is determined as 0, the scale factor S has a value of more than 0 and less than 1, and the maximum extension coefficient MAL has a value more than 0 and less than 1. Here, the constant value of the initial state is converged into a uniform value inside several seconds after the operation of the organic light emitting display device such that any other value may be estimated inside the above-described range.

The controller 655' determines whether the value of the current amount TC is less than or more than the predetermined range when the value is not in the predetermined range (S203)

Firstly, the case in which the value of the current amount TC is less than the predetermined range will be described. When the value of the current amount TC is less than the predetermined range, the scale factor S is increased to increase the current amount TC.

The controller 655' determines whether the scale factor S has the maximum value 1 (S204). If the scale factor S does not have the maximum value, the scale factor S is increased by ΔS (S205). On the other hand, if the scale factor S has the maximum value, the scale factor S may not be increased such that the maximum extension coefficient MAL is increased (S206). ΔS has $1/2^{\text{the number of data bits}}$ in the present exemplary embodiment. That is to say, when the organic light emitting display device according to the present exemplary embodiment is operated with data of 8 bits, ΔS has a fixed value with $1/2^8$ (1/256). Here, ΔW has $1/2^{\text{the number of data bits}}$ in the present exemplary embodiment. That is to say, when the organic light emitting display device according to the present exemplary embodiment is operated with the data of 8 bits, ΔW has a fixed value of $1/2^8$ (1/256). However, differently from the present exemplary embodiment, the ΔS and ΔW values may have varying values. That is to say, ΔS and ΔW are estimated according to the predetermined function or to be changed according to the condition such that the current amount is optimized more quickly and correctly. If the values of ΔS and ΔW are large, the required current amount may be obtained quickly, but there is a danger that the luminance change of every frame may be visible.

On the other hand, the case in which the value of the current amount TC is less than the predetermined range will now be described.

Firstly, it is determined whether the maximum extension coefficient MAL has the minimum value of 0 (S207). If the maximum extension coefficient MAL does not have the minimum value, the maximum extension coefficient MAL is decreased by ΔW (S208). In the present exemplary embodiment, ΔW of S208 has $1/2^{\text{the number of data bits}}$ as in S206. According to the exemplary embodiment, it is possible for ΔW to have a different value from that if S206 to optimize the current amount.

Next, the controller 655' respectively outputs the decreased maximum extension coefficient MAL and the scale factor S to the partial extension coefficient determiner 654' and the scaler 651'.

On the other hand, if the maximum extension coefficient MAL has the minimum value 0, the scale factor S is decreased by ΔS (S209). ΔS of S209 has $1/2^{\text{the number of data bits}}$ in the present exemplary embodiment, as in S205. According to the exemplary embodiment, it is possible for ΔS to have a different value from that of S205 to optimize the current amount.

Next, the controller 655' respectively outputs the maximum extension coefficient MAL and the decreased scale factor S to the partial extension coefficient determiner 654' and the scaler 651'.

In this way, the controller 655' changes the scale factor S and the maximum extension coefficient MAL according to the current amount TC and respectively outputs them to the scaler 651' and the partial extension coefficient determiner 654'. Thus, the signal processor 650' converts the three-color input image signal R, G, and B into the four-color output image signal R1", G1", B1", and W1' according the changed values when generating the change of the scale factor S and the maximum extension coefficient MAL. The controller 655' again detects the current amount TC of the generated four-color output image signal R1", G1", B1", and W1' to control the current amount TC according to S201 to S209.

In this way, the signal processor 650' according to the current exemplary embodiment of the present invention uses the maximum extension coefficient MAL for limiting the scale factor S and the partial extension coefficient PW1 such that it limits the total current amount TC of one frame from exceeding the predetermined range. Accordingly, the increased luminance may be provided by using the partial extension coefficient compared with the use of the equal extension coefficient for the entire display panel. Also, the reduction of the lifetime and the increase of the consumption power of the organic light emitting diode due to the excess of the total current amount over the predetermined range that is generated may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic light emitting display device comprising:

a display panel including a plurality of pixels displaying a first color, a second color, a third color, and a white color; and a signal processor receiving a plurality of input image signals respectively corresponding to the pixels, and converting the input image signals of at least two dots respectively representing the first color to the third color among the input image signals according to a first extension coefficient to generate a plurality of four-color image signals of at least two dots respectively representing the first color, the second color, the third color, and the white color, to respectively sum a distortion amount of a color impression of the four-color image signals of at least two dots, to calculate a partial extension coefficient corresponding to the sum result, and to extension-convert the input image signals of at least two dots according to the partial extension coefficient to thereby generate the four-color output image signals of at least two dots, wherein the signal processor includes:

an RGBW converter extension-converting the input image signals of at least two dots according to the first extension coefficient to generate the four-color image signal of at least two dots, calculating an excess value by comparing grays respectively corresponding to the four-color image signal of at least two dots with a maximum gray, and extension-converting the input image signal of at least two dots according to the partial extension coefficient to generate the four-color output image signals of at least two dots;

a distortion adder calculating and summing the distortion of the color impression by using the calculated excess value to calculate the distortion amount of the color impression of a first region of the display panel corresponding to the input image signals of at least two dots; and a partial extension coefficient determiner calculating the partial extension coefficient according to the distortion amount of the color impression of the first region, estimating the partial extension coefficient as the partial extension coefficient of the first region, and transmitting the partial extension coefficient to the RGBW converter.

2. The organic light emitting display device of claim 1, wherein the partial extension coefficient determiner amends the partial extension coefficient of the first region by interpolating into the entire region of the display panel, and the partial extension coefficient corresponds to each address of the input image signal of at least two dots.

3. The organic light emitting display device of claim 2, wherein the RGBW converter extension-converts the input image signals of at least two dots by using the partial extension coefficient according to an address to generate the four-color output image signal of at least two dots.

4. The organic light emitting display device of claim 1, wherein the signal processor further includes a rearrangement portion receiving the four-color output image signals, and respectively rearranging the four-color output image signals according to the arrangement structure of the pixels.

5. The organic light emitting display device of claim 1, wherein:

the pixels are divided into a plurality of groups and the display panel is divided into a plurality of regions according to the groups; and the signal processor calculates the partial extension coefficient according to the sum result of the distortion of the color impression of the input image signals respectively corresponding to the plurality of regions.

6. The organic light emitting display device of claim 5, wherein the first extension coefficient is a partial extension coefficient corresponding to the regions representing at least two input image signals among a plurality of partial extension coefficients respectively corresponding to the regions in a previous frame.

7. The organic light emitting display device of claim 1, wherein the signal processor:

converts the magnitude of the input image signal according to a scale factor, extension-converts the converted input image signal of at least two dots among the converted input image signals according to the first extension coefficient to generate the four-color image signals of at least two dots corresponding to the first color, the second color, the third color, and the white color, to respectively sum the distortion amount of the color impression of the four-color image signal of at least two dots, to calculate the partial extension coefficient according to the sum result, and to extension-convert the converted input image signals of at least two dots according to the partial extension coefficient thereby generating the four-color output image signals of at least two dots corresponding to the first color, the second color, the third color, and the white color;

calculates a current amount corresponding to the four-color output image signals; and changes a maximum extension coefficient as a maximum value of the partial extension coefficient and the scale factor when the current amount exceeds a predetermined range.

8. The organic light emitting display device of claim 7, wherein the current amount is a total amount of the current corresponding to the four-color output image signal of one frame unit.

9. The organic light emitting display device of claim 7, wherein the signal processor includes:

a scaler converting the magnitude of the input image signals according to the scale factor, and generating the converted input image signals converted by the scale factor; and the RGBW converter respectively extension-converting the converted input image signals corresponding to the first extension coefficient to generate the four-color image signals, comparing the grays respectively corresponding to the four-color image signals of at least two dots with a maximum gray to calculate an excess value, and extension-converting the converted input image signal according to the partial extension coefficient to generate the four-color output image signal;

the distortion adder calculating the distortion amount of the color impression by using the calculated excess value, and summing the distortion amount of the color impression corresponding to the first region of the display panel corresponding to at least two converted input image signals;

the partial extension coefficient determiner calculating the partial extension coefficient according to the summed distortion amount of the color impression, estimating the calculated partial extension coefficient to be smaller than the maximum extension coefficient as the partial extension coefficient of the first region, and transmitting the partial extension coefficient to the RGBW converter; and a controller detecting the current amount of the four-color output image signals and controlling at least one among the scale factor and the maximum extension coefficient when the current amount exceeds the predetermined range for the current amount to be included in the predetermined range.

10. The organic light emitting display device of claim 9, wherein the controller determines whether the scale factor is a maximum value if the current amount is less than the predetermined range, and if the scale factor is the maximum value, the maximum extension coefficient is increased by the predetermined range, while if the scale factor is less than the maximum value, the scale factor is increased.

11. The organic light emitting display device of claim 9, wherein the controller determines whether the maximum extension coefficient is a minimum value if the current amount is more than the predetermined range, and if the maximum extension coefficient is the minimum value, the scale factor is decreased by the predetermined range, while if the maximum extension coefficient is more than the minimum value, the maximum extension coefficient is decreased.

12. The organic light emitting display device of claim 9, wherein the partial extension coefficient determiner amends the partial extension coefficient of the first region by interpolating into the entire region of the display panel, and transmits the partial extension coefficient along with the amended partial extension coefficient corresponding to the input image signal of at least two dots and the corresponding address to the RGBW converter.

13. The organic light emitting display device of claim 12, wherein the RGBW converter extension-converts the input image signal by using the partial extension coefficient corresponding to an address to generate the four-color output image signals.

14. The organic light emitting display device of claim 9, wherein the signal processor further includes a rearrangement portion receiving the four-color output image signal, and rearranging and storing the four-color output image signal according to the arrangement structure of the pixels.

15. A method for processing image signals of an organic light emitting display device including a plurality of pixels representing a first color, a second color, a third color, and a white color and generating a plurality of four-color output image signals by extension-converting a plurality of input image signals representing the first to third colors, comprising:

extension-converting a plurality of input image signals of at least two dots among the input image signals for the first to third colors according to the first extension coefficient to generate the four-color image signals of at least two dots;

calculating a distortion amount of a color impression corresponding to at least two dots, summing the calculated distortion amounts of the color impressions, and calculating a partial extension coefficient corresponding to the distortion amount of the color impression; and extension-converting the input image signals according to the partial extension coefficient to generate the four-color output image signals, wherein the calculating of the partial extension coefficient includes:

calculating an excess value by comparing each gray of the first to third colors among the four-color image signal of at least two dots except for the white color with a maximum gray;

calculating the distortion amount of the color impression of each of the dots by summing the calculated excess values by a unit of a dot; and adding the calculated distortions of the color impressions.

16. The method of claim 15, wherein the calculating of the partial extension coefficient further includes amending the partial extension coefficient by interpolating into the entire region of the display device.

17. The method of claim 16, wherein, in the generating of the four-color output image signal, the input image signals are extension-converted by using the partial extension coefficient corresponding to an address to generate the four-color output image signals.

18. The method of claim 15, further comprising receiving the four-color output image signals and rearranging the four-color output image signals according to the arrangement structure of the pixels.

19. The method of claim 15, wherein the first extension coefficient is a partial extension coefficient corresponding to a region representing the input image signal of at least two dots in a previous frame.

20. A method for processing image signals of an organic light emitting display device including a plurality of pixels representing a first color, a second color, a third color, and a white color and generating a plurality of four-color output image signals by extension-converting a plurality of input image signals representing the first to the third colors, comprising:

converting the magnitude of the input image signals according to a scale factor for the first to third colors, and generating the converted input image signals by the scale factor;

extension-converting the converted input image signals of at least two dots among the converted input image signals according to a first extension coefficient to generate the four-color image signals of at least two dots;

calculating a distortion amount of a color impression corresponding to at least two dots, summing the calculated distortion amounts of the color impressions, and calculating a partial extension coefficient corresponding to the summed distortion amount of the color impressions and less than a maximum value of the partial extension coefficient;

extension-converting the input image signals according to the partial extension coefficient to generate the four-color output image signals; and calculating a current amount corresponding to the four-color output image signal, and changing the scale factor or a maximum extension coefficient when the current amount exceeds a predetermined range.

21. The method of claim 20, wherein the changing of the scale factor or the maximum extension coefficient includes: determining whether the scale factor is a maximum value if the current amount is less than the predetermined range; increasing the maximum extension coefficient by the predetermined range if the scale factor is the maximum value; and increasing the scale factor if the scale factor is less than the maximum value.

22. The method of claim 20, wherein the changing of the scale factor or the maximum extension coefficient includes: determining whether the maximum extension coefficient is a minimum value if the current amount is more than the predetermined range; decreasing the scale factor by the predetermined range if the maximum extension coefficient is the minimum value; and decreasing the maximum extension coefficient if the maximum extension coefficient is more than the minimum value.

* * * * *